Arthur W. Pearson
INVENTOR,

BY
Bernard P. Miller
ATTORNEY

Oct. 18, 1955  A. W. PEARSON  2,721,087
CONDITION RESPONSIVE TRAILER HITCH
Filed Dec. 20, 1952  2 Sheets-Sheet 2

Arthur W. Pearson
INVENTOR,

BY
Bernard P. Miller
ATTORNEY

United States Patent Office 2,721,087
Patented Oct. 18, 1955

2,721,087

CONDITION RESPONSIVE TRAILER HITCH

Arthur W. Pearson, Edmond, Okla.

Application December 20, 1952, Serial No. 327,067

2 Claims. (Cl. 280—447)

The present invention relates to towing hitches for trailers, such as house trailers, boat trailers, etc.

The prime object of the present invention is to provide a safe dependable towing hitch which will not "jack-knife" either in abrupt stopping or in backing.

Another object is to provide a trailer hitch which eliminates, to a great extent, any tendency of the trailer to weave during forward motion at high speeds, even on curves.

A further object is to provide a trailer hitch which makes it possible for the trailer to be locked in longitudinal alignment with the towing vehicle, so that the trailer may be backed in a straight path.

An additional object is to provide a trailer hitch which will not sag, when supporting the weight of the front end of a two wheeled trailer.

A still further object is to provide a device of this class which includes two positive means for limiting in both directions, the lateral movement of the trailer with relation to the towing vehicle.

Other objects will be apparent from the following description when taken in conjunction with the accompanying two sheets of drawings, wherein.

Like characters of reference designate like parts in those figures of the drawings in which they occur.

In the drawings.

Figure 1:
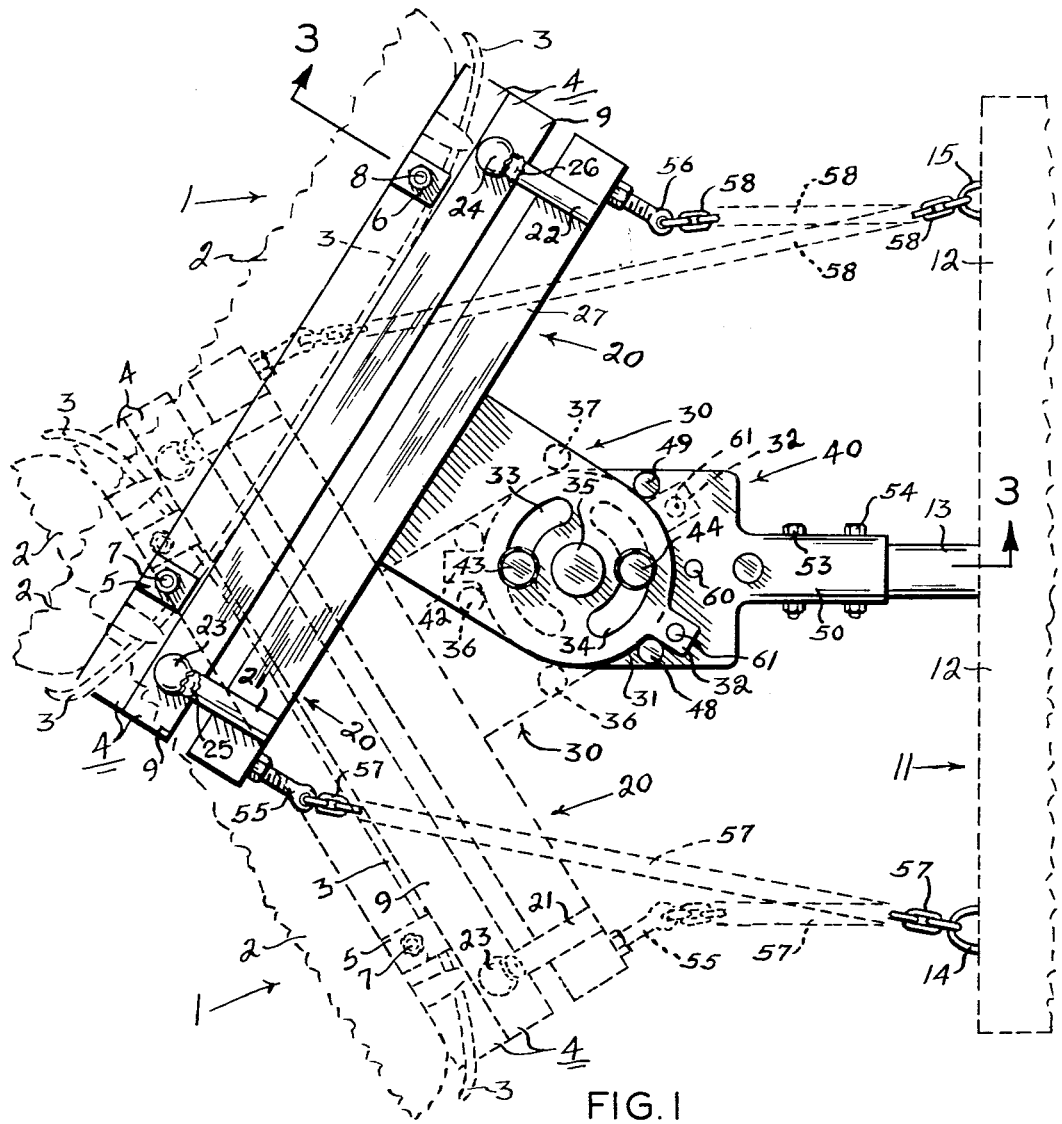
Figure 1 is a top view of the device operatively mounted between a trailer and a towing vehicle, the vehicle and the trailer being shown in dotted lines, and other dotted lines showing the device turned in an opposite direction from that illustrated in the solid lines.
Figure 2:
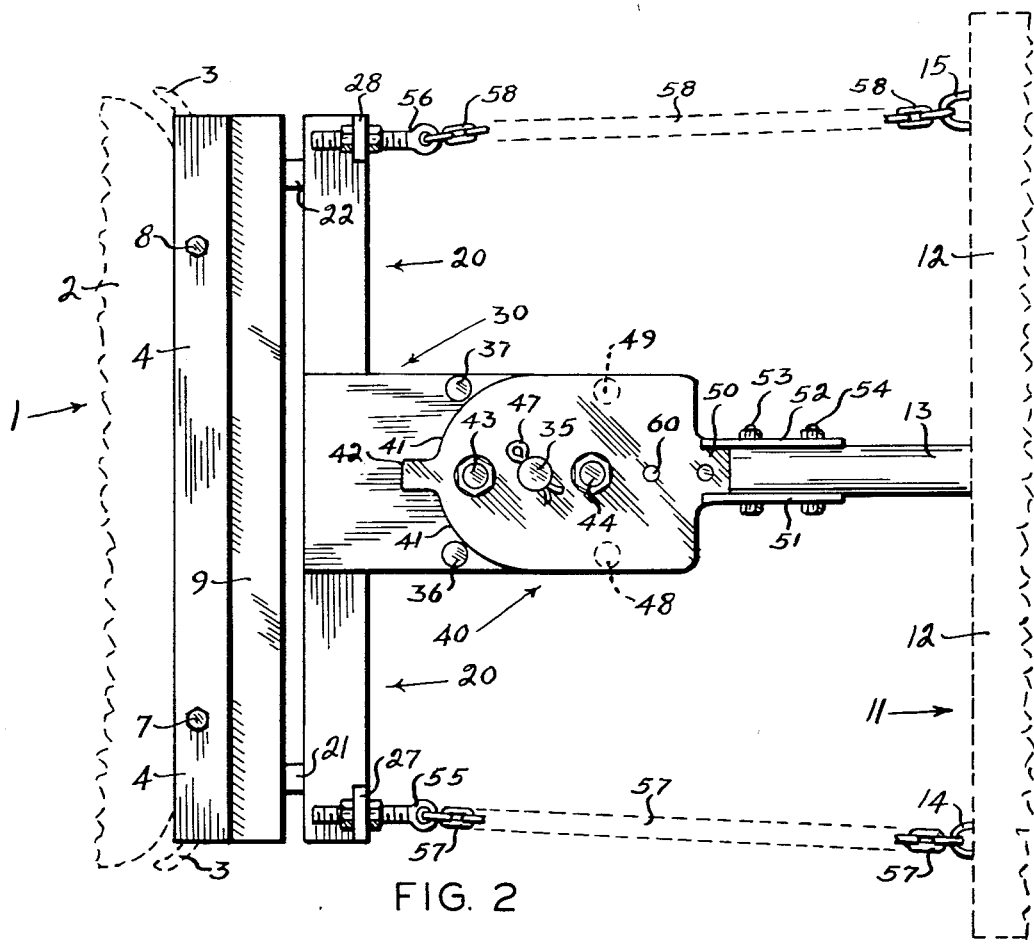
Figure 2 is a bottom view of the same but showing the trailer and the vehicle in longitudinal alignment; and, Figure 3 is a vertical sectional view taken substantially along the bent line 3—3 of Fig. 1.
Figure 3:
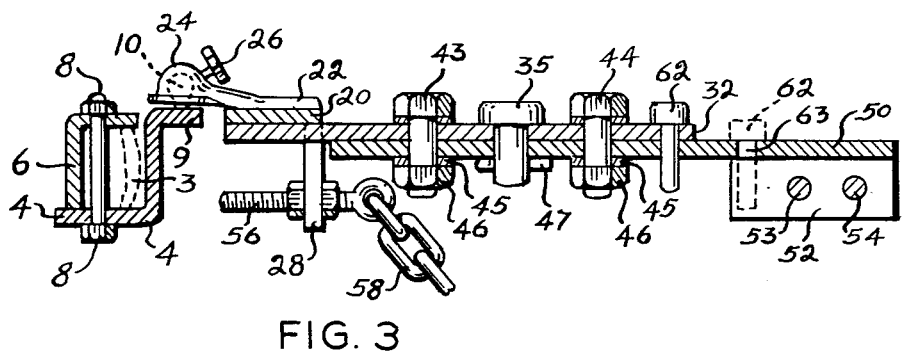

The reference numeral 1 indicates, as a whole, a conventional automobile, which may well constitute the towing vehicle for descriptive purposes hereinbelow, said automobile having a rear horizontal cross-member 2 and a rigidly mounted rear bumper 3 carried thereby. As is best illustrated in Fig. 3, the bumper 3 supports a horizontal beam 4 which is rigidly anchored thereto by clamping brackets 5—6 and vertical bolts 7—8. The beam 4 covers the major portion of the length of the bumper 3, and is provided with a co-extensive rearwardly projecting flange 9, the upper surface of which is provided with two spaced apart upstanding coupler balls, one of which is shown in Fig. 3 and is indicated by the reference numeral 10. The beam 4, the brackets 5 and 6, and the coupler balls are a conventional means for connecting a trailer to a towing vehicle, except that in most instances, the beam 4 is shorter in length and its flange 9 is usually equipped with only one of the coupler balls. The hitching mechanism of the present invention is designed, however, to be used in conjunction with two spaced apart coupler balls 10, as is more fully described hereinbelow. The coupler balls are preferably spaced a little farther apart than are the two clamping brackets 5 and 6.

The reference numeral 11 indicates, as a whole, a conventional wheeled trailer having a front horizontal crossbeam 12 centrally equipped with a rigid forwardly projecting horizontal tongue 13. The cross-beam 12 and tongue 13 are conventional with present day trailers of many types, however, the cross-beam shown in the accompanying drawings is provided with two spaced apart rigid forwardly projecting loops or eyes 14 and 15 which have a purpose more fully described hereinbelow.

The trailer hitch of the present invention, in addition to the un-conventional long beam 4 and its two coupling balls 10, consists substantially of the following described structure.

There is provided as a part of the invention a horizontal rectangular metal tow-beam 20 which is substantially the same length as the cross-beam 4, and which is provided with two spaced apart forwardly projecting rigid horizontal arms 21 and 22. The arms 21 and 22 are spaced apart a distance equal to the spacing of the two coupling balls 10 on the flange 9 of the cross-beam 4, and the forward end of each of the arms has a downwardly facing ball-socket adapted to envelop one of the coupling balls. The two ball-sockets are conventional, and are respectively indicated by the reference numerals 23 and 24, and they are provided with conventional ball clamping mechanisms which may be tightened by handwheels 25 and 26 respectively. The ball-joint connections are used for connecting the trailer hitch to the towing vehicle because of the ease with which they may be connected and disconnected and yet give a wide range of vertical articulation between the hitch and the towing vehicle. The rear portions of the arms 21 and 22 are rigidly welded to the upper surface of the tow beam 20.

At each of its ends, the rear edge of the tow beam 20 is provided with a depending flange, said flanges being indicated by the reference numerals 27 and 28, and their function is more fully described hereinbelow.

Intermediate its ends, the lower face of the tow beam 20 is rigidly welded flatly to the front end portion of a thick metal plate 30 which projects rearwardly from the beam 20 in a horizontal position. The plate 30 has a rear arcuately curved end edge 31 with an elongated rearwardly projecting rectangular tongue 32 formed in the center of said end. The rear central portion of the plate 30 is provided with two arcuate through guide slots 33 and 34 which are struck on identical radii, and which concentrically surround, partially, a through perforation for receiving a vertical pivot pin 35. The lower surface of the plate 30 is provided at each side edge with one of two depending stop lugs 36 and 37, the function of which is more fully explained hereinbelow.

Beneath said plate 30, and lying flatly against the lower face of the plate 30, is a second thick metal plate 40, the major portion of which is rectangular in general configuration, and which has a front arcuate end edge 41 similar to the edge 31 of the plate 30. The plate 40, at the center of its arcuate edge 41 is provided with an integral forwardly projecting rectangular tongue 42, which is similar in shape to the tongue 32 at the rear end of the plate 30. The central portion of the plate 40 is perforated to receive the lower end portion of the pivot pin 35. A transverse cotter-pin 47 is passed through the lower end of the pivot pin 35. The plate 40 is vertically perforated in two longitudinally spaced places to receive front and rear guide pins 43 and 44. The pins 43 and 44 respectively project upwardly through the guide slots 33 and 34, and their lower ends are each threaded to receive conventional nuts 45 and lock-nuts 46. The nuts 45 and 46 are left sufficiently loose on the guide pins to permit lateral pivotal movement of the plate 40 on the pivot pin 35.

Obviously, this lateral swinging or pivotal movement of the plate 40 with relation to the plate 30 is limited in sweep by the length of the guide slots 33 and 34, in which the guide pins 43 and 44 travel. This swinging movement is also limited, to the same extent, by the presence of the two lugs 36 and 37 which lie at the ends of the swinging path of the tongue 42 at the front end of the plate 40. In order to further limit, to the same extent, the amount of swinging movement permitted to the plate 40, the plate is provided at its side edges with stop lugs 48 and 49 which project upwardly in the swinging path of the tongue 32 on the rear end of the plate 30.

The rear end of the plate 40 has an integral rearwardly projecting leg 50 which is substantially rectangular in configuration, and which has two side edges bent downwardly to provide two parallel flanges 51 and 52. The two flanges 51 and 52 are provided for the purpose of receiving therebetween and closely nesting the front end portion of the trailer tongue 13. Lateral bolts 53 and 54 pass through the flanges 51 and 52 and through the tongue 13 to rigidly anchor the tongue in place.

As a means for further insuring the proper limiting of the lateral swinging movement of the plate 40 with relation to the plate 30, the two depending flanges 27 and 28 which are carried by the rear edge of the tow-beam 20, are through perforated horizontally to receive threaded eye-bolts 55 and 56 respectively. A steel chain 57 extends between the eye-bolt 55 and the loop 14 on the front edge of the trailer cross-beam 12, and a similar chain 58 extends between the eye-bolt 56 and the loop 15 of the cross-beam 12. The two chains 57 and 58 are of identical length, and this length is barely sufficient to allow the plate 40 to pivot the distance permitted by the guide slots 33 and 34.

In order to firmly lock the two plates 30 and 40 in longitudinal alignment and to hold them against any relative pivotal movement, the plate 40 is provided with a vertical through perforation 60, and the tongue 32 of the plate 30 is provided with a similar through perforation 61. When the two plates 30 and 40 are in perfect longitudinal alignment with each other, the two perforations 60 and 61 are in registration so they may complementally receive an anchoring pin 62 which may be dropped in place therein. When the pin 62 has thus been inserted, the trailer 11 may be backed in a straight path. When not in use for anchoring purposes, the pin 62 may be carried in a vertical perforation 63 provided therefor in the plate 40.

When the above described trailer hitch mechanism is installed, as above described, it functions to couple the towing vehicle 1 to the trailer 11, there being four different means for positively limiting the lateral pivotal movement permitted between the vehicle and the trailer. These means are: the arcuate slot 33 and the guide pin 43; the arcuate slot 34 and the guide pin 44; the tongue 32 and the upstanding lugs 48—49; and the tongue 42 and the depending lugs 36—37. In addition to those four limiting means, which operate to limit the swinging movement in both directions, the two chains 57 and 58 act to limit such movement in one direction each.

The trailer may be easily and quickly un-coupled from the towing vehicle by merely releasing the two hand-wheels 25 and 26, so that the socket members 23 and 24 may be lifted off the two coupling balls, which are carried by the flange 9 of the beam 4.

The pivot pin 35, and the two guide bolts 43 and 44, together with their nuts 45—46, act to prevent any substantial amount of vertical rocking movement between the two plates 30 and 40.

Obviously the invention is susceptible to some change or alternation without defeating its practicability, and I therefore do not wish to be confined to the preferred embodiment shown in the drawings and described herein, further than I am limited by the scope of the appended claims.

I claim:

1. In a mechanism for hitching a trailer to a towing vehicle, the combination with a pair of horizontally spaced apart ball-joint connections rigidly carried by the rear of said vehicle, of: a pair of plates in horizontal superposition, hinged about a central vertical pivot pin; one of said plates rigidly connected at its forward end to a transverse horizontal beam, said beam rigidly attached at each of its ends, respectively, to said ball-joint connections; one end of the other said plate rigidly connected to the forward end of said trailer; arcuate through-slots in one of said plates concentric with said pivot pin; vertical guide pins rigidly carried by the other said plate slidable within said slots when one plate is pivotally moved with relation to the other plate; arcuate edges on the free ends of said plates concentric with said pivot pin; a central horizontally projecting tongue on each said arcuate edge; a plurality of depending and upstanding lugs rigidly carried vertically in spaced-apart relation by the upper and lower said plates, respectively, on opposite sides of said tongues adjacent said arcuate edges, the spacing of said lugs from said tongues, when centrally positioned, substantially equal to the length of the slidable movement of said guide pins in said arcuate slots, whereby upon side to side movement of one of said plates, the guide pins contact the ends of said arcuate slots simultaneously with the contact of said tongues with said lugs limiting the sideways movement of said trailer.

2. Structure as specified in claim 1, and a central through-perforation in one said tongue in co-operative alignment vertically with a through-perforation in the other said plate; and a removable anchor pin within said perforation, whereby when said anchor pin is in place, the pivoted plates are held in rigidly aligned position for backing the trailer.

References Cited in the file of this patent

UNITED STATES PATENTS

| | | |
|---|---|---|
| 1,732,580 | Heckman | Oct. 22, 1929 |
| 2,120,422 | Williams et al. | June 14, 1938 |
| 2,325,822 | Whitmer | Aug. 3, 1943 |
| 2,577,145 | Nearing et al. | Dec. 4, 1951 |
| 2,592,219 | West et al. | Apr. 8, 1952 |
| 2,614,861 | Van Horn | Oct. 21, 1952 |